Oct. 16, 1951 G. H. GOODMAN ET AL 2,571,705
CARTON CUTTER ATTACHMENT FOR DRINK MIXERS
Filed Aug. 29, 1947
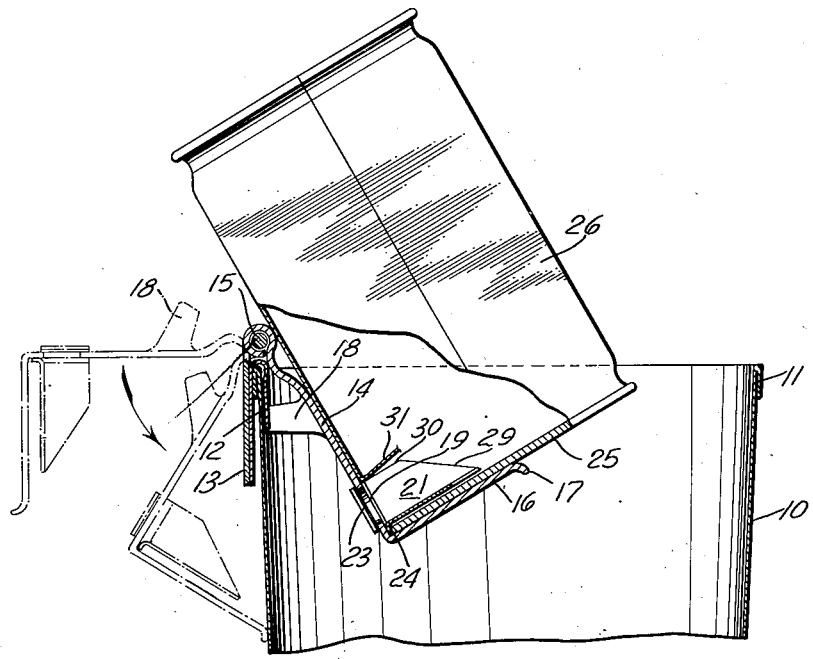
FIG. 1.
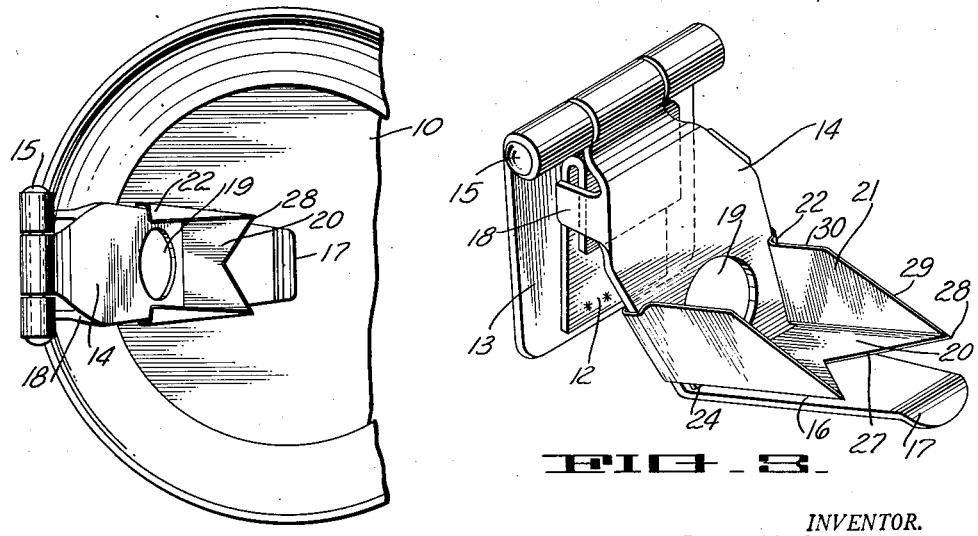
FIG. 2.
FIG. 3.
INVENTOR.
GUY H. GOODMAN
BY ALBERT B. STAPLES
their atty.

Patented Oct. 16, 1951

2,571,705

UNITED STATES PATENT OFFICE 2,571,705

CARTON CUTTER ATTACHMENT FOR DRINK MIXERS

Guy H. Goodman and Albert B. Staples, Oakland, Calif.

Application August 29, 1947, Serial No. 771,166

3 Claims. (Cl. 222—84)

Our invention relates to attachments for use in conjunction with beverage mixer containers.

The beverage mixer container of the type with which our attachment is used is commonly employed in soda fountains and similar places for mixing drinks, such as malted milks, milk shakes and other refreshments in which the principal ingredient is a liquid such as milk. Such containers are generally constructed of metal or plastic materials, are approximately cylindrical in shape, having an open top and closed bottom. The counter clerk places measured quantities of milk, flavoring, ice cream and other desired ingredients in the container, and mounts the latter in an electric beverage mixer which whips the ingredients to the desired consistency.

It is becoming increasingly common for creameries to package milk in paper or fiber cartons of various capacities and particularly in pint and half-pint sizes, which latter quantities are those commonly used in mixing beverages of the above-described character. Such cartons have a number of advantages, among which are the fact that they are not as fragile as the previously employed glass bottles, may be easily stacked in refrigerators and impress sanitation in the mind of the customer. The paper or fiber cartons are manufactured with stoppered pouring spouts or lips which are satisfatcory under many conditions of use, but the use thereof is time consuming and therefore undesirable at busy soda fountains since the aggregate time consumed during a day in opening the cartons and pouring the contents into beverage mixer containers is large. It is one of the advantages of our invention that the latter reduces the amount of time which the operator must devote to delivering the milk from the paper carton into the mixer container.

One of the objects of the invention is to provide an attachment for a beverage mixer container which will puncture a paper milk carton and properly position the punctured carton over the beverage mixer container so that the contents of the former may rapidly drain into the latter without further attention from or manipulation on the part of the operator.

A further object of the invention is to provide means for rapidly and expediently attaching and removing the attachment from the beverage mixer container.

Another advantage of the invention is the provision of means whereby the attachment may be swung out of the way when a beverage mixer container is being used respectively on the electric mixer or being stored between periods of use.

Still another object of the invention is to provide means for accurately guiding the paper carton into position for puncturing so that the puncture occurs as closely adjacent the bottom of the carton as possible to insure drainage of substantially the entire contents.

A still further object of the invention is to provide means in the attachment for positioning the carton during the draining operation so that all of the contents of said carton will be quickly delivered into the beverage mixer container without further assistance or urging on the part of the operator.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawing:

Figure 1 is a vertical sectional view showing the attachment of the invention installed on a beverage mixer container and illustrating a milk carton positioned on the attachment after having been punctured and while draining, the dot-and-dash lines indicating the retracted position of the attachment.

Figure 2 is a top plan view of the structure of Figure 1 with the carton removed.

Figure 3 is an enlarged perspective view of the attachment removed from the beverage mixer container.

A conventional beverage mixer container 10, with which the attachment of the invention is particularly adapted for use, from the closed bottom to the open top, and is generally formed with a reinforcing rim 11 about the upper end thereof. The attachment which comprises the invention is designed for ready installation upon such a container. We provide a spring-clip 12, U-shaped to straddle and firmly engage the rim 11 of the container. When desired, the spring clip 12 may be removed from the container, but normally the clip 12 is maintained attached thereto. Permanently affixed to the clip 12 by spot-welding, riveting or by other suitable means is an upwardly-extending strap element 13. A second strap element 14 is connected to the first strap element 13 by the pivot pin 15 in the manner of the conventional strap hinge. The second strap element 14 is bent at a right angle approximately midway of its length to provide a guide lip 16, the latter being bent downwardly adjacent its extremity as is shown at 17. Ears 18 are formed on the second strap element 14 to abut against the clip 12 so as to hold the guide lip 16 in an angularly inclined position of approximately 30° with respect to the horizontal when the container 10 is in normal upright position. A discharge port 19 is formed in the second strap element 14 above the right-angle bend.

A sheet metal puncturing member, consisting of a horizontal base 20 and edgewise vertical flanges 21, is provided, the latter being relatively inclined so as to provide abutment portions 22 and clips 23, all so constructed that the clips 23 engage the rear surface of the second strap element 14 and the abutment portions 22 engage the front surface of the second strap element 14 to hold the puncturing member on the second strap element 14 but to permit a slight amount of vertical movement therebetween. The base 20 is bent downwardly to form a lip 24 to hold the base 20 a predetermined minimum distance from the guide portion 16, which distance is approximately the thickness of the bottom 25 of a paper milk carton 26.

The forwardly-extending portion of the base 20 is formed with a V-shaped notch 27, the apex of the V being directed inwardly toward the strap element 14. Hence sharp points 28 occur at a juncture of the base 20 and the flanges 21 and function to primarily pierce the paper milk carton 26 as hereinafter more fully described. The angles between the planes of the flanges 21 and the plane of the base 20 are less than right-angles, being approximately 80°. The edges of the flanges 21 incline upwardly and rearwardly from the points 28 at an angle of approximately 45° with respect to the plane of the base 20 as is shown by the reference numeral 29 for a distance of approximately one-half their projected lengths and the edges then extend approximately parallel to the base 20 as is shown by reference numeral 30 up to the abutment portions 22. The base 20 is shown in the drawings as being substantially flat, but it may be given a convex or concave form if desired.

In operation, the operator swings the attachment from the position shown in the dot-and-dash lines of Figure 1 to the position shown in the solid lines of Figure 1. The operator then holds the beverage mixer container 10 in one hand and grasps a paper milk carton 26 with the other hand at the same time moving the paper carton 26 toward engagement with the prongs 28 with the bottom 25 of the carton in engagement with the lip 16. The bent-down extremity 17 helps to guide the carton 26 onto the guide member 16 so that the motion may be performed rapidly. The operator continues movement of the paper carton 26 along the guide portion 16 so that the prongs 28 puncture the side of the carton immediately above the bottom 25, such distance being governed by the downwardly bent portion 24 of the base 29. Continued movement of the carton causes the base 20 to slit the paper carton parallel to the bottom thereof and the flange edges 29 to slit the carton along lines at approximately 80° with respect to and intersecting the horizontal slit. This operation cuts a tab 31 into the side of the carton, which tab is bent inwardly of the carton by the upper portions of the flanges 21 as the latter pass through the carton sidewall. The parallel portions 30 of the flanges 21 hold the carton on the puncturing member and keep the tab 31 in open position. Milk then runs through the opening left by bending back the tab 31 and may escape into the container 10 through the discharge port 19. The ears 18 position the carton 26 in a proper degree of inclination so that the milk rapidly drains into the beverage mixer container 10 without further attention or urging on the part of the operator, the angularity between the bottom and the container 10 being such as to insure that all the liquid will drain out of the carton. The operator may attend to other details in the short time required for the milk to drain out of the container. After sufficient time has elapsed for the completion of this operation, the operator removes the carton 26, swings the attachment to the dot-and-dash position indicated in Figure 1, adds such other ingredients as may be desired, and attaches the container 10 to the electric mixer. The retracted position of the attachment insures that it will not interfere with the operation of the electric mixer and also conveniently permits numbers of the containers 10 to be nested one within the other during periods when they are not in use.

We claim:

1. An attachment for a container comprising, means for connecting said attachment to the container, body means pivotally connected with said means whereby in one position thereof said body means will be disposed substantially entirely within said container and in a second position will be outside of the container, means carried by said body means for puncturing a substantially rectangularly shaped notch in a fibrous carton including a notched base portion spaced from said body means and flanges disposed at an acute angle with respect to said base portion, said flanges having inclined edges, said inclined edges and said base portion meeting in sharp prongs, and means on said body means for positioning said body means to permit draining of substantially the entire contents of the carton into the container.

2. An attachment for a container comprising, means for resiliently connecting said attachment to the container, body means pivotally connected with said means, guide means on said body means to receive a fibrous carton and confine manual movement of the carton, a notched base portion positioned parallel to said guide means, flanges disposed at an angle with respect to said base portion, said flanges having inclined edges, said inclined edges and said base portion meeting in a plurality of sharp prongs, separation means on said base portion holding said base portion removed from said guide means a distance substantially equal to the thickness of a wall of the carton, discharge means on said body means for receiving the flow of contents from said container and means on said body means for positioning said body means to permit draining of substantially the entire contents of the carton into the container.

3. An attachment for a container comprising, means for connecting said attachment to the container, a fibrous carton supporting means pivotally connected with said means, and means carried by said supporting means for puncturing said carton including a base portion spaced from said supporting means a distance substantially equal to the thickness of a wall of the carton and notched at one extremity and flanges disposed at an acute angle with respect to said base portion, said flanges having edges inclined with respect to said base portion in a zone adjacent said extremity thereof to form sharp prongs and parallel to said base portion in a zone remote from said extremity.

GUY H. GOODMAN.
ALBERT B. STAPLES.

REFERENCES CITED

The following references are of record in the file of this patent:

UNITED STATES PATENTS

| Number | Name | Date |
| --- | --- | --- |
| 1,979,573 | Nichols | Aug. 21, 1934 |
| 1,994,157 | Wiswell | Mar. 12, 1935 |
| 2,134,127 | Hopkins | Oct. 25, 1938 |
| 2,282,150 | Andary | May 5, 1942 |
| 2,354,518 | Halstead | July 25, 1944 |